United States Patent Office 3,071,402
Patented Jan. 1, 1963

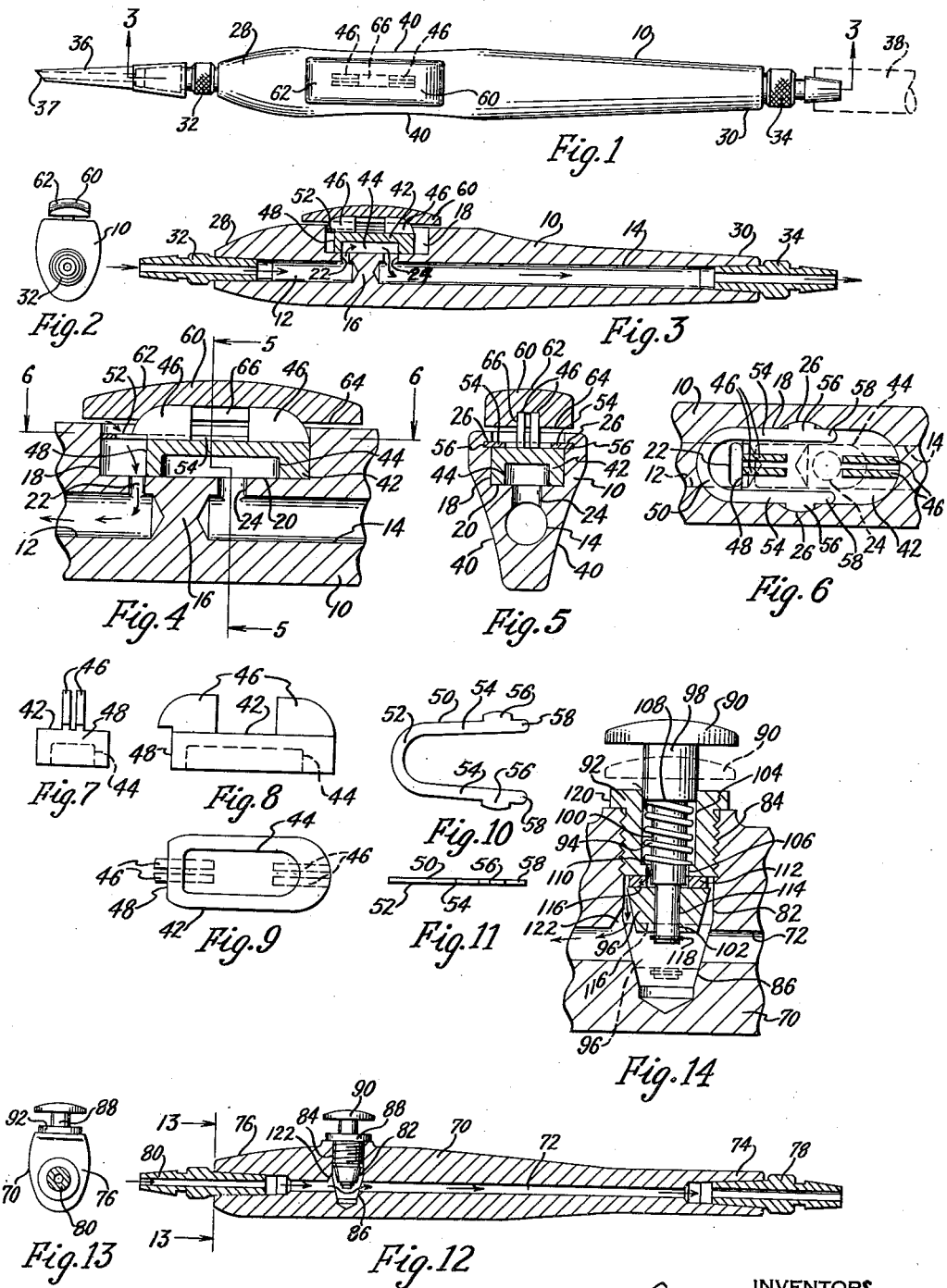

3,071,402
VACUUM-OPERATED PROBE TOOLS
Stephen W. Lasto and Raymond A. Duhaime, Shelton, Conn., assignors to Air-Vac Engineering Company, Incorporated, Milford, Conn., a corporation of Connecticut
Filed Sept. 28, 1959, Ser. No. 842,735
2 Claims. (Cl. 294—64)

This invention relates generally to vacuum-operated probe tools, and particularly to improvements in such tools which result in improved operation thereof and permit quick and easy assembly and disassembly thereof to facilitate cleaning of the tools and their components.

Vacuum-operated probe tools of the type contemplated by our invention have many industrial uses and new industrial uses will undoubtedly be continually found. General examples of such uses are wherever it is desirable to hold, lift and/or locate small, delicate or intricate parts in industrial assembling, inspection or cleaning procedures.

To be more specific, our vacuum-operated probe tools equipped with appropriate nozzle tips may be employed in handling small components during assembly of intricate assemblies, such as those which include miniature ball bearings. In this use, in addition to effectively and readily holding small components during assembly, such components are vacuum cleaned as they are held. Furthermore, it is convenient for the completed assembly to be vacuum cleaned by the probe tool, which also comprises a miniature vacuum cleaner.

Another specific use of our vacuum-operated probe tools equipped with appropriate nozzle tips is to hold minute, delicate, fragile or flexible objects for careful inspection, such as microscopic inspection. Such holding for inspection may be readily, safely and quickly performed without damaging the objects. Our vacuum-operated probe tools eliminate the pinching or mechanical holding which has been heretofore employed to hold such objects, and which frequently damaged the objects by nicking or bending them. Furthermore, the holding force of our vacuum-operated probe tools is uniform, whereas in known prior holding devices the holding force varies with the operator. The force created by our vacuum-operated probe tool is constant, uniform and gentle, and a large variety of parts of different types and materials may be held.

Our vacuum-operated probe tools may also be used to minimize accidents and equipment breakdowns in press rooms where operations, such as blanking, piercing, parting, progressive die work and simple compound die work are being performed. By utilizing our tools with appropriate nozzle tips, a machine operator may vacuum clean a die, or remove or relocate a part in a die without personal danger. Such was not possible in the past. This enables punches, die openings and other machine tool components to be maintained in clean, workable, safe condition.

It is an object of this invention to provide improved, vacuum-operated probe tools that are capable of performing the above functions, and of being used in many other comparable industrial uses, and which are of simple, inexpensive construction, and are readily and quickly assembled and disassembled to facilitate their cleaning.

The above and other objects and further details of that which we believe to be novel and our invention will be clear from the following description and claims taken with the accompanying drawings, wherein:

FIG. 1 is a top plan view of one form of the invention;
FIG. 2 is a front elevational view thereof looking from the left in FIG. 1;
FIG. 3 is a longitudinal vertical sectional view thereof taken substantially on line 3—3 of FIG. 1;
FIG. 4 is an enlarged view of a portion of FIG. 3, but showing some of the parts (the slide valve member and the finger pad) in different positions to which they may be moved during operation;
FIG. 5 is a sectional view taken substantially on line 5—5 of FIG. 4;
FIG. 6 is a sectional view taken substantially on line 6—6 of FIG. 4;
FIGS. 7, 8 and 9 are, respectively, a front elevational view, a side elevational view and a bottom plan view of the slide valve member;
FIGS. 10 and 11 are, respectively, a top plan view and a side elevational view of the retainer;
FIG. 12 is a longitudinal vertical sectional view taken through another form of the invention;
FIG. 13 is a sectional view taken substantially on line 13—13 of FIG. 12; and
FIG. 14 is an enlarged view of a portion of FIG. 12.

Two forms of the invention are illustrated in the drawing as being embodied in two types of vacuum-operated probe tools. The first form is illustrated in FIGS. 1–11 and is designated the "slide" type. The second form is illustrated in FIGS. 12–14 and is designated the "push button" type. Both forms of the invention operate in the same general manner, are useful in performing the same general functions, and are intended to be used with a source of vacuum which may take any known convenient form. Both forms of the invention enable an operator to perform delicate operations and to easily and quickly disassemble the tools to allow their cleaning, as set forth in the introduction to the specification.

The "slide" type, vacuum-operated probe tool illustrated in FIGS. 1–11 comprises a body 10 which houses and/or supports all of the remaining components of the tool. The body 10 is elongated and may be conveniently formed by casting or an equivalent method. Aluminum is a suitable material out of which the body 10 may be formed; however, if desired, other materials may be utilized. Extending longitudinally through the body 10 is an interrupted passageway formed by coaxial front and rear passageway portions 12 and 14, respectively. Internally of the body 10, the adjacent ends of the passageway portions 12 and 14 are interrupted by transverse body wall 16. The upper side of the body 10 has a depending recess 18 formed therein which is somewhat oblong and oval in general horizontal outline, and which depends to a horizontal flat wall surface 20 which is spaced slightly above the interrupted passageway. The recess 18 is configured and disposed in the body 10 so as to longitudinally and transversely overlap the adjacent ends of the passageway portions 12 and 14 (see FIG. 6). On the forward side of the body wall 16, a slot 22 is formed in the body 10 and extends vertically between the front passageway portion 12 and the recess 18 and places these areas in communication with each other. On the rearward side of the body wall 16 a port 24 is formed in the body 10 and extends vertically between the rear passageway portion 14 and the recess 18 and places these areas into communication with each other. Disposed longitudinally approximately midway of the recess 18 and near the top thereof is a pair of spaced, oppositely extending, arcuate notches 26 which communicate with said recess.

The longitudinal end 28 of the body 10 is designated the front end and the opposite end 30 is designated the rear end. The front passageway portion 12 is slightly outwardly flared at its forward end and extends completely through the front end 28. The rear passageway portion 14 is slightly outwardly flared at its rearward end and extends completely through the rear end 30. A front connector 32 is detachably frictionally secured in the flared forward end of the front passageway portion 12. A rear connector 34 is detachably frictionally secured in the flared rearward end of the rear passageway portion 14. A nozzle tip 36 of appropriate material and configuration which are suitable to perform the function which the tool is to perform, is detachably frictionally secured to the front connector 32. An end 38 of a conduit which is connected to a source of vacuum of any convenient known form is detachably frictionally secured to the rear connector 34. Intermediate the ends of the body 10, the sides of said body are relieved at 40 to facilitate gripping of the tool by the fingers of the operator.

Slide valve member 42, which is illustrated by itself in FIGS. 7–9, is mounted in the recess 18 for selective longitudinal sliding under the control of the operator. Slide valve member 42 is generally oval and oblong in horizontal outline, is of a width to slidably fit in the recess 18 and of a length which is somewhat less than the longitudinal extent of the recess 18. An upwardly extending, downwardly facing cavity 44 is formed in the lower side of the slide valve member 42. On the upper side of the slide valve member 42 there are formed two pairs of cooperating, spaced, flexible walls 46. The forward lower side of the slide valve member 42 is cut away at 48.

The slide valve member 42 is inserted into the recess 18 from above the body 10 and mounted for controlled longitudinal sliding in a horizontal direction. Vertically upward movement is prevented by retainer 50, which is shown by itself in FIGS. 10 and 11. Retainer 50 is generally U-shaped and is preferably made of a flat, spring metallic material. Retainer 50 comprises U-shaped portion 52 having a pair of spaced legs 54 which diverge when the retainer is in the free state. The divergence is exaggerated somewhat in FIG. 10 for the purpose of illustration. The legs 54 are laterally resilient and include a pair of oppositely extending, arcuate tabs 56 and terminate in ends 58.

After the slide valve member 42 is disposed in the recess 18 in the position illustrated in the drawing, the retainer 50 is mounted in the recess 18 and disposed in the position illustrated in the drawing. Retainer 50 is mounted by being inserted into recess 18 from the top of the body in such a manner than its U-shaped portion 52 is adjacent the body walls which form the forward portion of the recess 18, its legs 54 extend rearwardly therein, and the tabs 56 extend laterally into notches 26. When the retainer 50 is mounted in the foregoing manner, it is firmly seated and temporarily locked in recess 18 by the tabs 56-notches 26 cooperative relationship, the locking effect of which is enhanced by the laterally opposite bias of the tabs 56 which is caused by the stressing of the retainer when it is mounted in the recess 18. A comparison of FIGS. 6 and 10 will indicate how the free state, diverging legs 54 are stressed so as to be substantially parallel when the retainer 50 is fully mounted in the recess 18. When the slide valve member 42 and the retainer 50 are both fully mounted in the recess 18, the retainer legs 54 straddle the upwardly extending, flexible walls 46 of the slide valve member and contact the upper side of a front portion of the slide valve member. Therefore, upward movement of the slide valve member 42 is restrained by the retainer 50. However, the relative dispositions of these parts are such that the slide valve member 42 may be longitudinally slid in the recess 18.

Finger pad 60 is rigidly connected to the slide valve member 42 and arranged to slide it longitudinally under the selective control of the operator. Finger pad 60 is a generally planar and rectangular member having a slightly curved, upper surface 62 which may be roughened, serrated or transversely grooved (these formations are for the purpose of facilitating finger gripping and are not illustrated) and a flat lower surface 64 in which is formed an upwardly longitudinally extending, narrow groove 66. After the slide valve member 42 and the retainer 50 have been mounted in the recess 18, the finger pad 60 is secured to said slide valve member by having the upwardly extending flexible walls 46 thereof forced into the groove 66 of the finger pad. When the finger pad is fully mounted on the slide valve member, it is removably but firmly frictionally secured to the flexible walls 46, and it is jointly longitudinally movable with the slide valve member.

The parts, in the form of the invention being described, when fully mounted are generally disposed as illustrated in FIGS. 1–6. In FIG. 3, the slide valve member 42 is illustrated in the forwardmost position, and in FIGS. 4–6 it is illustrated in its rearwardmost position. These two positions comprise the two principal operating conditions of the tool. When in its forwardmost position, slide valve member 42 is disposed so as to have its cavity 44 overlap both the port 20 and slot 22 and thereby place the passageway portions 12 and 14 into communication with each other. When disposed in this manner, and assuming a source of vacuum communicates with the rear end 30 of the tool body 10, a flow of air is induced through the tool as indicated by the schematic arrows in FIG. 3. When in this condition, the source of vacuum which is applied to the rear end 30 of the tool body induces a flow of air from the atmosphere, through the nozzle tip 36, the front passageway portion 12, the slot 22, the cavity 44, the port 24 and the rear passageway portion 14. This results in the creation of a vacuum at the front opening 37 of the nozzle tip 36 which may be utilized to perform any of the delicate operations set forth in the introduction to the specification; the front nozzle opening 37 is sufficiently small so as to be capable of performing such delicate operations.

When it is desired to temporarily terminate the vacuum at the front opening 37 of the nozzle tip 36 during operation of the tool, the operator slides the slide valve member 42 to its rearwardmost position, illustrated in FIGS. 4–6, by manually engaging the top surface 62 of the finger pad 60 and moving it rearwardly relative to the tool body 10. When the slide valve member 42 and the finger pad 60 are in their rearwardmost positions, it should be observed that: (1) communication of the passageway portions 12 and 14 is interrupted by the slide valve member, and (2) the front passageway portion 12 is vented to the atmosphere.

(1) When in its rearwardmost position, the slide valve member 42 is disposed relative to the tool body 10 in the recess 18 in such a manner that its cavity 44 overlies only the port 24. Therefore, communication of the port 24 and slot 22 is physically disrupted by the slide valve member. In the rearwardmost position of the slide valve member, the source of vacuum acts on the slide valve member 42 so as to firmly seat it and retain it in such position. The seating force on the slide valve member 42 caused by the vacuum, however, may be readily overcome intentionally by an operator forcing the finger pad forwardly. When in its rearwardmost position, the slide valve member 42, by interrupting the communication of the port 24 and slot 22, removes the source of vacuum from the front passageway portion 12.

(2) In order to destroy the vacuum at the front opening 37 of the nozzle tip 36 when the slide valve member 42 is in its rearwardmost position, the front passageway portion 12 is vented to the atmosphere at this time. This venting is caused by placing the slot 22 into communication with the recess 18 through the cut-away 48 formed in the slide valve member 42. This causes the front passageway portion 12 ultimately to communicate with the atmosphere because the recess 18 communicates therewith, all as is indicated by the schematic arrows in FIG. 4, and therefore, air is allowed to enter into the front passageway portion 12 and fill the previously existing vacuum therein.

It should, therefore, be apparent that when it is desired to destroy the vacuum at the front opening 37 of the nozzle tip 36, the finger pad 60 and slide valve member 42 are manually slid rearwardly, and that this action both removes the vacuum source from the front passageway portion 12 and allows the latter to be vented to the atmosphere to destroy the vacuum at the front opening 37 of the nozzle tip 36. Therefore, delicate operations involving the use of the "slide" type, vacuum-operated tool just described may be performed under the sensitive, selective control of an operator, and be effectuated by the finger operation of finger pad 60 and slide valve member 42 through a relatively short longitudinal stroke.

Due to the fact that in normal use of the tool it is prone to become dirty and clogged up with foreign matter on its interior, the FIGS. 1–11 form of the invention has been consciously created so as to be quickly and easily disassembled to permit thorough cleaning of all of its component parts. Assuming that the tool is in the assembled condition illustrated in FIGS. 1–6, in order to disassemble it to permit cleaning it is simply necessary to pry the finger pad 60 off of the flexible walls 46 formed on the slide valve member 42, as by utilizing a screw driver, knife edge or similar device, and then to remove the retainer 50 out of the recess 18. The retainer 50 may be removed by inserting a knife edge or screw driver tip under one of the leg ends 58 and forcing said leg end laterally toward the other leg end 58 so as to remove its associated tab 56 out of the latter's associated notch 26; after one of the leg ends 58 and its associated tab 56 has been forced out of its normal assembled condition, it is a simple matter to remove the other leg end 58 and tab 56 out of its associated notch 26, and to withdraw the entire retainer out of the recess 18 through the open top thereof. With both the finger pad 60 and retainer 50 removed from the recess 18, the slide valve member 42 may then be removed from the recess 18 very readily. It should also be apparent that the tool body 10, the connectors 32 and 34, the nozzle tip 36 and the conduit end 38 may be separated very readily, and that all of the individual components of the tool may be individually thoroughly and effectively cleaned. Reassembly of the tool components is effected by the same procedure as original assembly thereof, which is set forth above. In view of the fact that frequent cleaning of the tool and its components is necessary in normal use, the quick and easy manner of assembling and disassembling the tool provides an extremely important practical advantage.

In FIGS. 12–14 there is illustrated another form of the invention which is designated the "push button" type. Only the portions of the second form of the invention which differ materially from the first form will be specifically described.

In FIGS. 12–14, the elongated tool body 70 includes a longitudinal passageway 72 that extends completely through the tool body from the rear end 74 thereof to the front end 76 thereof. The rear and front connectors 78 and 80, respectively, are detachably secured to the rear and front ends 74 and 76. Intermediate the ends of the body 70 near the front end 76 thereof there is formed a vertically extending recess 82 having an upper portion 84 that is generally cylindrical and threaded over approximately its upper half, and a lower portion 86 which is tapered and generally conical. The recess 82 extends through the body 70 at the top thereof, but terminates short of the bottom thereof. Removably mounted in the recess 82 is a pushbutton valve assembly designated generally as 88.

The assembly 88 is self-contained and bodily mountable and removable from the body 70 as a unit. It comprises a push button 90, a mounting bushing 92, a compression spring 94, a valve member 96 and associated parts which will be set forth subsequently (see FIG. 14). The push button 90 includes a shank portion 98 that is reduced at 100 and 102. The shank portion 98 extends through a central bore 104 formed in the bushing 92, and has its reduced shank portion 100 exteding through a counterbore 106, which is formed in the bushing 92 and is coaxial with the bore 104 but of smaller diameter. Spring 94 is disposed around the reduced shank portion 100 and contacts an annular shoulder 108 which connects the shank portion 98 and shank reduced portion 100, and the annular shoulder 110 which connects the bore 104 and counterbore 106. An annular sealing gasket 112 is disposed about the reduced shank portion 100 in the vicinity of where the reduced shank portions 100 and 102 are adjacent. One side of gasket 112 contacts the lower end of bushing 92. The valve member 96, which is frusto-conical in external configuration, includes a central bore 114 which seats on the reduced shank portion 102 and has a flat upper surface 116 which is in contact with the other side of the gasket 112. The valve member 96 is retained on the reduced shank portion 102 by a detachable retainer 118, which may be of any convenient form, such as a removably mounted C-ring. It should be noted that the entire assembly 88 is maintained in assembled condition by the retainer 118 and that when so assembled, the spring 94 is normally stressed and biases the push button 90 to its upper position relative to the bushing 92 (the full line position in FIGS. 12–14). It should also be noted that the assembly 88 may be quickly and readily disassembled for cleaning.

The assembly 88, as pointed out above, is self-contained and may be bodily mounted on or removed from the tool housing 70 as a unit. To effect such mounting or removal, the bushing 92 is provided with a flange 120 of greater diameter than that of the upper portion 84 of the recess 82, and the remainder of the bushing 92 is externally threaded so as to be readily threadedly received in the threaded part of the upper portion 84 of the recess 82.

When assembly 88 is fully mounted and the tool is in operative condition with a source of vacuum attached to the rear connector 78, and a nozzle tip (not shown) connected to the front connector 80, the assembly 88 is normally in the full line condition illustrated in FIGS. 12–14. In this condition, a flow of air is induced through the tool as indicated by schematic arrows in FIGS. 12, and therefore, a vacuum is created at the front opening of the nozzle tip. In this condition, the tool may be used to perform delicate operations as set forth above. When it is desired to destroy the vacuum at the front opening of the nozzle tip, the push button 90 is depressed by a finger of the operator, and this results in the push button, its shank portion 98, the gasket 112, the valve member 96, and the retainer 118 being moved downwardly relative to the body 70 to their dotted line position in FIG. 14. Depression of the push button 90 compresses the spring 94 and thereby further stresses the spring. Therefore, the push button 90, valve member 96 and associated parts are in their lowermost dotted line position only as long as the push button 90 is maintained depressed. As soon as the finger of the operator is released from the push button 90, the spring 94 unstresses and returns the movable parts of the assembly 88 to their uppermost solid line condition.

When the push button 90 is depressed and the valve member 96 and associated parts are in their lowermost positions, the normally continuous passageway 72 is interrupted by the physical interposition of valve member 96 in the lower portion 86 of recess 82, and the source of vacuum is no longer effective in the front portion of passageway 72, that is the portion thereof that is disposed forwardly of the recess 82 (the portion between the recess 82 and the front end 76). Since it is desirable when the source of vacuum is interrupted to destroy the vacuum at the front opening of the nozzle tip, said front portion of passageway 72 is vented at this time. Venting is effected by the provision of a cut-away notch 122 which is formed in the vicinity of where said front portion of passageway 72 communicates with the recess 82. When the valve member 96 is in its lowermost position, the interior of said front portion of passageway 72 is placed into communication with the portion of the recess 82 that is above the upper flat wall 116 of the valve member, and a flow of venting air is permitted as is indicated by the schematic arrows in FIG. 14. Note carefully the dispositional relationship of the notch 122 and the valve member wall 116 at the time the latter is in its lowermost dotted line position. In view of the number of clearances formed in the assembly 88 between the pushbutton shank portion 98 and the bores in the bushing 92, venting to the atmosphere is permitted through the assembly 88.

In view of the foregoing, it will be apparent that we have illustrated two forms of our invention, and that both of these forms possess important advantages by providing improved operational characteristics and quickly and readily detachable constructions to facilitate cleaning. In both illustrated forms of the invention a relatively light weight probe tool is provided which can be comfortably grasped and held in the hand of an operator, and the operation of which may be selectively and sensitively controlled by a single finger. The major operational distinction between the two illustrated forms resides in the control motion; in one instance finger-actuated longitudinal sliding is utilized, and in the other instance finger-actuated push button depression is utilized. However, both illustrated forms of the invention constitute distinct advances in vacuum-operated probe tools.

In both illustrated forms of the invention the tools are "self-cleaning," and the tool body may be cast of an appropriate light-weight material and have the passageways and recesses machined therein. Also, in both forms the exterior of the tool body is configured to comfortably nest within the fingers of the operator to thereby enable sustained use of the tool without unduly tiring the operator. Further, in both forms the front and rear connectors are tapered fittings that require only slight finger pressure to seat and effect leakproof connections. Furthermore, the nozzle tips and conduit ends may be readily rotated relative to the connectors and tool body to effect the most comfortable dispositional relationship for a particular operation and operator. Further still, in both forms a large variety of different type nozzle tips may be employed for various operations. For example, the size of the nozzle tip opening or the shape and length of the nozzle tip may be varied for various operations. Therefore, it is contemplated that a plurality of different types of interchangeable nozzle tips may be provided with a single tool body.

With particular regard to the "slide" type of tool, it should be particularly noted that the slide valve member has a very short stroke, in practice in the order of one-eighth inch, and that the slide valve member requires no finger pressure to maintain it in either of its two major positions in a leakproof manner, for in each major position, it is maintained in a sealed condition relative to the tool body supporting surface by the vacuum within the tool body. Further, in the "slide" type, the upper surface of the finger pad may have a supplemental finger grip in the form of a soft resilient knob mounted thereon, if desired.

With particular regard to the "push button" type of tool it should be particularly noted that the self-contained, removable, pushbutton valve assembly may be mounted and removed with an appropriate wrench or plier-like tool. In operation of this type, the spring is designed to be of a strength that is sufficient to normally overcome the holding force of the vacuum that tends to retain the valve member seated when it is in the "closed" position, and thereby normally bias the valve member to its "open" position. Therefore, only slight operator finger pressure is required to overcome the spring and move the valve from "open" to "closed" position, it being noted that when in the latter position the vacuum in the tool body acts on the valve member and assists in retaining it in a "closed" position. Further, it should be noted that the valve member is illustrated as "floating" slightly, and that the retainer is described as being detachable, such as a removably mounted C-ring. With regard to the latter, it should be realized that, if desired, the retainer may be dispensed with, and the lower extremity of the pushbutton shank portion may have a washer staked thereon. If this alternative is employed, however, the advantage of a completely disassemblable pushbutton valve assembly will be lost.

As will be evident from the foregoing description, certain aspects of our invention are not limited to the particular details of construction of the examples illustrated, and we contemplate that various and other modifications and applications will occur to those skilled in the art. It is, therefore, our intention that the appended claims shall cover such modifications and applications as do not depart from the true spirit and scope of our invention.

What we claim as new and desire to secure by Letters Patent of the United States is:

1. A vacuum-operated tool comprising: an elongated body having a transverse recess opening to the atmosphere through only one side of said body with a longitudinally extending flat wall formed therein; a pair of longitudinally extending passageway portions extending from opposite ends of said body toward each other and separated by a body wall so as to terminate short of each other adjacent to said recess; a pair of spaced openings extending through said flat wall and connecting the adjacent ends of said passageway portions to said recess; a valve member slidably mounted in said recess on said flat wall in the longitudinal direction of said elongated body between two positions and having a cavity facing said flat wall; said cavity being arranged to overlie both of said openings and thereby place said passageway portions into communication when said valve member is in one position and to overlie only one of said openings and thereby prevent said passageway portions from communicating when said valve member is in the other position; a U-shaped retainer having a pair of laterally resilient spaced legs having oppositely extending tabs; and a pair of aligned notches formed in said body in said recess at locations that are spaced from said flat wall; said retainer being detachably secured to said body in said recess by said tabs being disposed in said notches, and said retainer being in position to restrain movement of said slide valve out of said recess but to allow sliding movement of said valve member in said recess.

2. A tool as defined in claim 1 wherein said valve member has a notch formed therein which is arranged to uncover one of said openings when said valve member is in said other position, whereby the passageway portion which communicates with said one of said openings is vented to the atmosphere through said recess around said valve member.

References Cited in the file of this patent

UNITED STATES PATENTS

| | | |
|---|---|---|
| 954,927 | Burdick | Apr. 12, 1910 |
| 989,735 | Triquet | Apr. 18, 1911 |
| 1,302,028 | Fuchs et al. | Apr. 29, 1919 |
| 1,598,615 | Marsh | Sept. 7, 1926 |
| 1,743,212 | Harris | Jan. 14, 1930 |
| 2,280,658 | Miller | Apr. 21, 1942 |
| 2,316,981 | Smith | Apr. 20, 1943 |
| 2,505,410 | Klaas | Apr. 25, 1950 |

FOREIGN PATENTS

| | | |
|---|---|---|
| 897,499 | Germany | 1953 |